Figure 1:
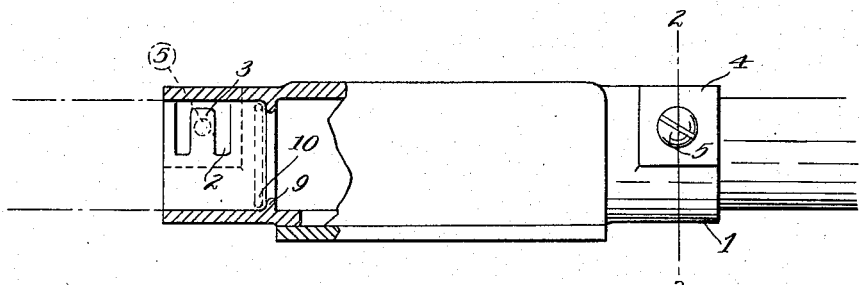

M. C. ROSENFELD.
CLAMPING DEVICE.
APPLICATION FILED JULY 8, 1913.

1,174,288.

Patented Mar. 7, 1916.

Witnesses:
R. L. Bruck.
Brennan B. West

Inventor.
Mortimer C. Rosenfeld
By Hull & Smith,
Attys.

UNITED STATES PATENT OFFICE.

MORTIMER C. ROSENFELD, OF CLEVELAND, OHIO.

CLAMPING DEVICE.

1,174,288.  Specification of Letters Patent.  Patented Mar. 7, 1916.

Application filed July 8, 1913. Serial No. 777,857.

*To all whom it may concern:*

Be it known that I, MORTIMER C. ROSENFELD, a citizen of the United States, residing at Cleveland, in the county of Cuyahoga and State of Ohio, have invented a certain new and useful Improvement in Clamping Devices, of which the following is a full, clear, and exact description, reference being had to the accompanying drawings.

This invention relates to clamping devices whereby a pipe, rod, or the like, can be firmly secured to other pipes or rods, or to other articles, as may be desired.

The invention is applicable to any case in which it is desired to secure together the abutting ends of two pipes or rods or to secure the end of a pipe or rod to a box, anchorage, or other fitting, or to attach a hook or support to a pipe or rod, either for the purpose of supporting the pipe or rod itself or for supporting other devices therefrom, and generally wherever a simple, firm, and secure attachment is desired.

The object of the invention is the provision of a securing device of great simplicity, strength, cheapness, and ease of operation.

In the drawings accompanying and forming part of this application, I have illustrated my improved clamping device as employed in connection with the conduit-receiving sockets of an outlet box and with a pipe support, although it will be understood that my invention is not restricted to these uses but may be employed in any case for which it may be applicable, without restriction to the uses shown.

Figure 2:
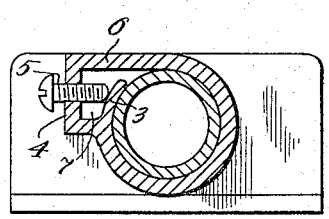
Figure 3:
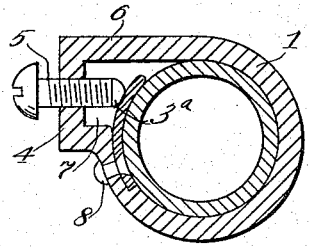

In these drawings, Figure 1 represents a side elevation of an outlet box provided with the clamping device of my invention, one of the receiving portions or sockets being shown in longitudinal section; Fig. 2 is a transverse cross-sectional view upon the line 2—2 of Fig. 1; Fig. 3 is a cross sectional view of a different form of connection, illustrating a slightly modified construction of clamp; and Fig. 4 illustrates the application of my improved clamping device to a pipe hanger.

It will be seen that, whatever the use to which the device is to be put, a socket or receiving portion 1 is provided which is adapted to receive snugly the pipe, rod, or other connected device, the interior of said receiving portion or socket being formed with a U-shaped slot 2 defining a tongue 3 whose interior surface coincides with the interior surface of the receiving portion or socket. Outside of this tongue and spaced therefrom is a rigid portion 4 in which is threaded a set screw 5 whose point presses against the rearward side of this tongue. In the embodiment illustrated in Figs. 1, 2, and 3, the rigid portion 4 is secured to the walls of the receiving portion or socket 1 by means of integral sides 6, forming a closed chamber 7, the better to prevent leakage to or from the pipes or devices being coupled and to prevent the collection of foreign matter about the set screw. In the device shown in Fig. 4, however, this chamber is left open, as shown at 7$^a$.

Figure 4:
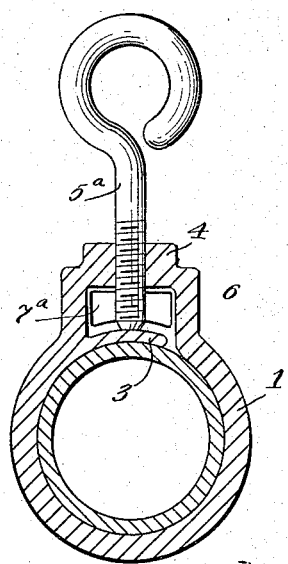

The tongue 3 may be made integral with the socket wall, as shown in Figs. 1, 2 and 4, or may be made separate therefrom, as shown at 3$^a$ in Fig. 3, and secured thereto by rivets 8, or in any other appropriate manner. If the device is intended for an outlet box, stops 9 may be employed to limit the insertion of the conduit ends; if it is to be used as a connecting sleeve for conduit sections, as suggested in Fig. 3, these stops may be omitted so as to permit the sleeve to slide along the section. Likewise, in a pipe support as illustrated in Fig. 4, the stops will be omitted, while the screw 5 may be replaced by a hook 5$^a$ which shall at the same time serve to compress the tongue from the supporting attachment.

It will be apparent that a firm and reliable connection is afforded by my improved clamp without any necessity for threading or grooving the entering members and without the necessity for accurately measuring or carefully assembling the parts, while the tightness of the coupling will be sufficient for a great many purposes without further attention. Gaskets may, however, be used as shown at 10 in Fig. 1. A further advantage of the clamping construction resides in the fact that the pressure of the adjusting screw (whether a set screw or the end of the threaded hook) is distributed over a considerable area of the clamped member, securing a more efficient clamping action than if the point of the screw should contact directly with said member and also avoiding cracking, indenting, or injuring said member.

Having thus described my invention, what I claim is:—

1. In a device of the kind described, the combination with a receiving member substantially cylindrical in shape and having a portion thereof removed, leaving a portion which can be forced inwardly, of means carried by said receiving member to force the said portion inwardly as set forth.

2. In a device of the kind described, the combination with a receiving member having a receiving portion substantially cylindrical, said receiving member having a lateral extension, of means movable through said lateral extension and adapted to engage the receiving portion, a part of said receiving portion being cut away, providing a free tongue beneath the means carried by the lateral extension.

3. In a device of the character described, the combination with a receiving member having a circular receiving portion and a lateral support carried by said receiving member, and a screw working through said lateral support and adapted to engage a portion of the receiving member and force the same inwardly as set forth.

4. In a device of the character described, the combination, with a receiving member having a receiving portion or socket adapted to receive a rod or tube, said receiving portion or socket having in its wall a U-shaped slot defining a flexible tongue, of a support carried by said receiving member outside of said tongue, and a screw threaded into said support and having its point adapted to engage said tongue whereby said tongue may be constricted upon a rod or tube within said receiving portion or socket, said tongue being arranged circumferentially of said member.

In testimony whereof, I hereunto affix my signature in the presence of two witnesses.

MORTIMER C. ROSENFELD.

Witnesses:
  J. B. HULL,
  BRENNAN B. WEST.

Copies of this patent may be obtained for five cents each, by addressing the "Commissioner of Patents, Washington, D. C."